United States Patent [19]

Craft

[11] 4,199,787
[45] Apr. 22, 1980

[54] INTERCARRIER SOUND SYSTEM
[75] Inventor: Jack Craft, Bridgewater, N.J.
[73] Assignee: RCA Corporation, New York, N.Y.
[21] Appl. No.: 961,508
[22] Filed: Nov. 17, 1978
[51] Int. Cl.² ........................................... H04N 5/62
[52] U.S. Cl. ................................................. 358/197
[58] Field of Search .................. 358/21 R, 197, 198, 358/165

[56] References Cited

U.S. PATENT DOCUMENTS

| | | | |
|---|---|---|---|
| 2,896,015 | 7/1959 | Smith | 358/31 |
| 3,564,125 | 2/1971 | Avins | 358/197 X |

OTHER PUBLICATIONS

RCA Linear Integrated CK Databook, pp. 381–383, 1977.
IEEE Trans. on Broadcast & TV Receivers, 1974, vol. BTR-20, pp. 6–13.

Primary Examiner—Robert L. Griffin
Assistant Examiner—Aristotelis M. Psitos
Attorney, Agent, or Firm—Eugene M. Whitacre; William H. Meagher; W. Brinton Yorks, Jr.

[57] ABSTRACT

An intercarrier sound system is provided in which a single transistor is used as both the intercarrier sound mixer and a sound I.F. amplifier. The transistor has an input circuit which includes its base-to-emitter junction, and an output circuit including its collector electrode and one of its base and emitter electrodes. Picture and sound carrier signals are applied to the transistor by way of the input circuit and are mixed across the base-to-emitter junction of the transistor. Means are provided at an electrode of the transistor common to the input and output circuits having an impedance which varies inversely with frequency. The variable impedance means causes the amplification provided by the transistor to vary directly with frequency over a band of frequencies including the video signal and the intercarrier sound signal frequencies.

10 Claims, 3 Drawing Figures

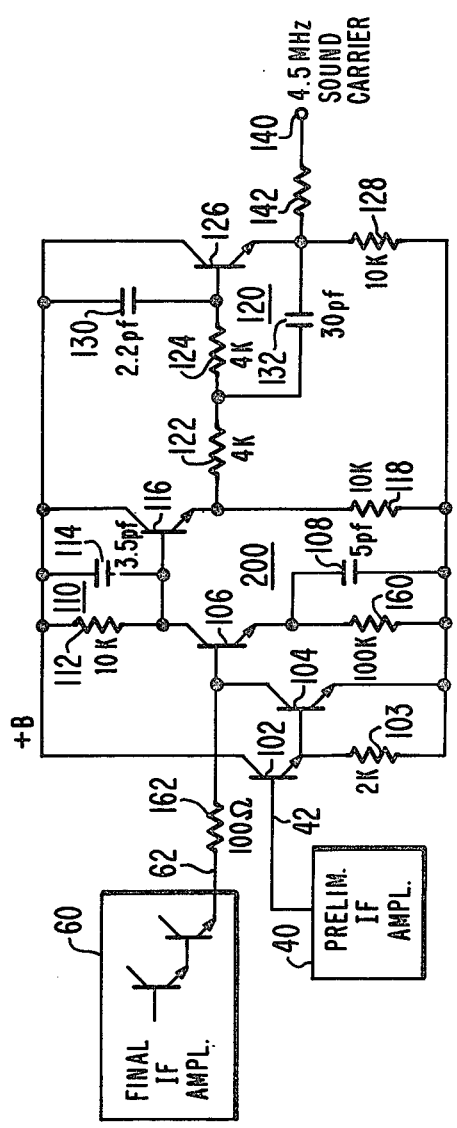

INTERCARRIER SOUND SYSTEM

This invention relates to television receivers using the intercarrier sound system and more particularly to a system for obtaining the angle modulated intercarrier sound signal in a color television receiver.

In a color television receiver having an intercarrier sound system, both the picture and sound intermediate frequency carriers are amplified in a common I.F. channel. The amplified carriers are coupled to a mixing circuit, which combines the signals to develop the 4.5 MHz modulated intercarrier sound I.F. signal (NTSC system), which is the intermodulation product of the sound and picture carriers. The 4.5 MHz intercarrier sound signal is then amplified by a sound I.F. amplifier, filtered and amplitude limited, and supplied to a frequency modulation detector for recovery of the sound information. The sound and picture I.F. carriers are also coupled to a video detector by way of a tuned trap circuit, which removes the sound carrier from the I.F. signal. The video detector recovers the video information for further processing by the luminance, chrominance and deflection systems of the color television receiver.

While the basic intercarrier sound system described above satisfactorily develops the 4.5 MHz intercarrier sound signal under most operating conditions, problems can arise when the sound system inadvertently detects the video signal of the picture carrier. To produce the intercarrier sound signal, the I.F. sound and picture carriers are combined, or mixed, by the nonlinear operation of a rectifying device (e.g., a diode or base-emitter transistor junction). In addition to generating the intercarrier sound signal, the rectifying device will also operate as a video detector for the picture carrier, and will detect the amplitude modulated video signal. The detected video signal will appear at the output of the rectifying device in combination with the 4.5 MHz intercarrier sound signal, causing the D.C. level of the intercarrier sound signal to vary with the amplitude of the detected video signal.

The intercarrier sound channel normally includes a high-Q, 4.5 MHz tuned circuit prior to the F.M. sound detector, for selecting the intercarrier sound signal to the relative exclusion of the accompanying video signal. If the output of the sound mixer is directly coupled to this 4.5 MHz tuned circuit prior to further signal amplification, the detected video signal can be removed from the intercarrier sound signal before it will adversely affect the operation of the sound system.

However, when the sound mixer is contained in an integrated circuit in the television receiver, it is generally desirable to amplify the intercarrier sound signal on the I.C. chip, where amplification is easily implemented, so that a high-level intercarrier sound signal is available for use external to the chip. In a typical I.C. chip, such as the CA3139E TV Automatic Fine Tuning and Intercarrier Mixer/Amplifier Circuit, manufactured by RCA Corporation, the intercarrier sound signal is amplified immediately following the mixer, and the signal which is coupled from the I.C. chip to the sound detector is a high level sound I.F. signal. Thus, it may not be necessary to amplify the sound I.F. signal prior to amplitude limiting and detection of the sound signal.

But since the detected video signal at the output of the mixer is not removed prior to amplification by the amplifier on the chip, it will be amplified by the mixer chip amplifier. If the video signal at the mixer output has an appreciable amplitude, the video signal can overload the mixer chip amplifier, thereby distorting, or even eliminating, the intercarrier sound signal. The peak excursions of the video signal can cause the mixer chip amplifier to saturate, or cut off. A component of the resulting intercarrier sound signal distortion will recur at a 60 Hz (vertical) rate, and can be severe enough to survive both limiting and F.M. detection. Such distortion will result in an audible 60 Hz buzz at the television speaker. Furthermore, since it is desirable to maintain the picture carrier at the input to the mixer at an amplitude which is substantially greater than that of the sound carrier (i.e., 25 to 30 decibels) to prevent amplitude modulation of the intercarrier sound signal by the amplitude-varying picture carrier, the overload condition resulting from a large amplitude video signal is a constant possibility.

In accordance with the principles of the present invention, an intercarrier sound system is provided in which a single transistor is used as both the intercarrier sound mixer and a sound I.F. amplifier. The transistor has an input circuit which includes its base-to-emitter junction, and an output circuit including its collector electrode. The picture and sound carriers are applied to the transistor by way of the input circuit and are mixed across the base-to-emitter junction of the transistor. Means are provided at an electrode of the transistor common to the input and output circuits having an impedance which varies inversely with the signal frequencies present in the input circuit. The variable impedance means provides signal degeneration for the transistor, such that the intercarrier sound signal appearing at the collector of the transistor is amplified to a greater degree relative to the lower frequency components of the video signal.

In the accompanying drawings:

FIG. 2 illustrates the base-emitter transfer characteristic for the mixing transistor of FIG. 1; and FIG. 3 illustrates, partially in block diagram form and partially in schematic diagram form, a second embodiment of the intercarrier sound system of the present invention.

Figure 1:
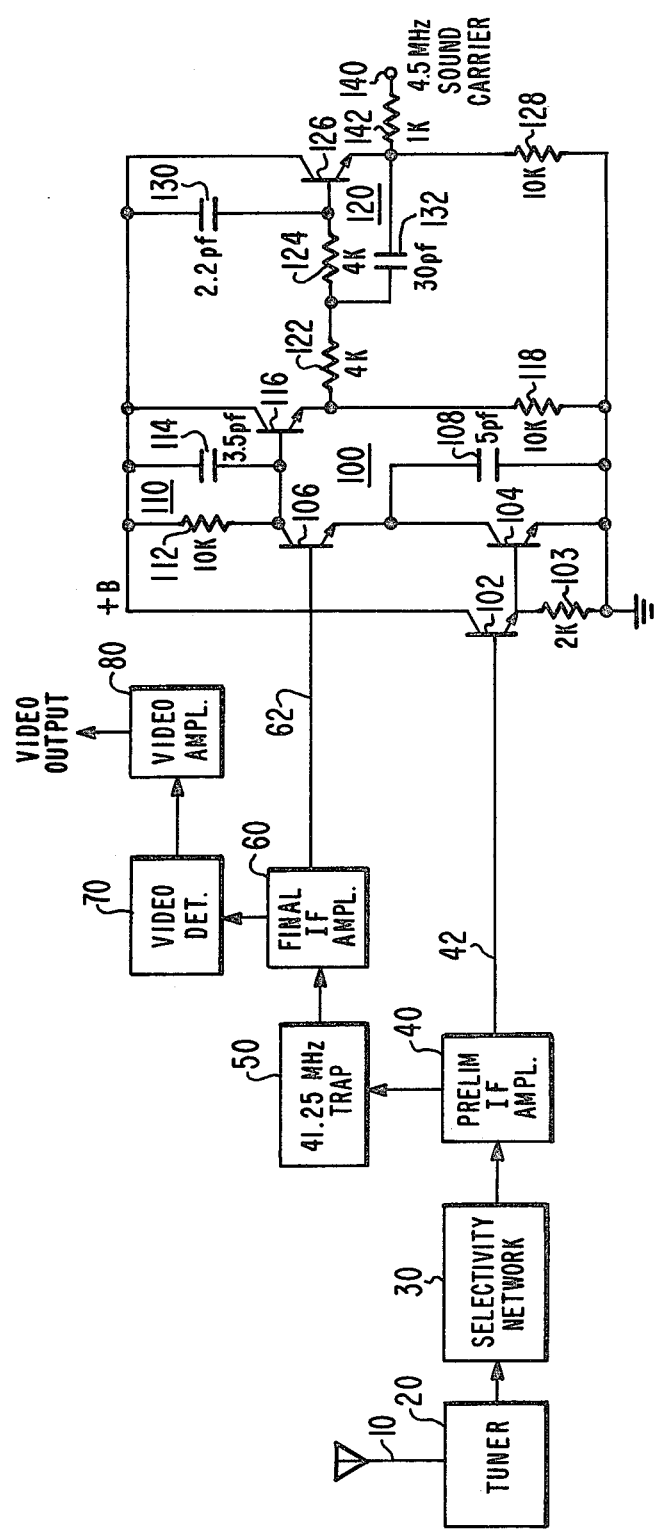
FIG. 1 illustrates an intercarrier sound system partially in block diagram form and partially in schematic diagram form.

Referring to FIG. 1, a broadcast television signal is received by an antenna 10 and is coupled to a tuner 20. The tuner 20 selects a single range of frequencies from among the many broadcast frequencies in the radio frequency band. The received broadcast signal is heterodyned with a signal from a local heterodyne oscillator in the tuner to create both the sum and difference frequencies of the original radio frequency and the local oscillator frequency. These signals are coupled to a selectivity network 30, where all but the difference frequencies, called intermediate frequencies (I.F.) are filtered out. The resultant I.F. signal includes a sound carrier, a picture carrier, and a chrominance subcarrier and certain of their sidebands which are passed by the selectivity network 30. The amplitude of the sound carrier is approximately 10 decibels lower than that of the picture carrier when the picture carrier is unmodulated (at sync tip).

The I.F. signals at the output of the selectivity network 30 are coupled to a preliminary I.F. amplifier 40. The preliminary I.F. amplifier 40 is comprised of one or more amplifying stages and increases the levels of the I.F. signals to approximately 6 millivolts for the sound carrier and 20 millivolts for the picture carrier at sync tip. These amplified I.F. signals are coupled to an intercarrier sound converter 100, and to a 41.25 MHz trap 50. The 41.25 MHz trap 50 comprises a filter circuit which is tuned to the frequency of the sound carrier to sharply attenuate the sound carrier relative to the picture carrier and chrominance subcarrier. It is desirable to attenuate the sound carrier prior to coupling the I.F. signal to the final I.F. amplifier 60 so as to prevent mixing of the sound carrier with the chrominance subcarrier in the video detector 70, which would generate a 920 KHz beat signal visible on the kinescope screen of the television receiver.

The I.F. signal at the output of the 41.25 MHz trap 50 is coupled to a final I.F. amplifier 60 which amplifies the I.F. signal further, and couples the amplified I.F. signal to a video detector 70. The video detector 70 detects the amplitude modulation of the picture carrier and couples the video signal to a video amplifier 80, which increases the level of the video signal for further processing by the luminance, chrominance and deflection systems in the television receiver. The amplified I.F. picture carrier produced by the final I.F. amplifier 60 varies in amplitude from one volt at sync tip level to 100 millivolts at the highest modulation level (white level).

The I.F. signals produced by preliminary I.F. amplifier 40 are coupled by a conductor 42 to the base electrode of an emitter follower transistor 102. The collector electrode of transistor 102 is coupled to a source of supply voltage (+B) and its emitter electrode is coupled to the base of a transistor 104 and to a source of reference voltage (ground) by a resistor 103. The sound carrier at the base electrode of transistor 104 has a substantially constant amplitude of approximately 6 millivolts rms, and the amplitude of the picture carrier at this point varies from 20 millivolts rms at sync tip to 2 millivolts rms at white level.

Transistor 104 has an emitter electrode coupled to ground and a collector electrode coupled to the emitter electrode of a mixer transistor 106. A capacitor 108 is coupled from the emitter electrode of transistor 106 to ground. Transistor 104 operates as a current source for transistor 106 and also couples the sound carrier to the mixer transistor 106 for intermodulation (mixing) with the picture carrier. The transistor 104 and the capacitor 108 together comprise the source impedance for transistor 106.

The amplified picture carrier produced by the final I.F. amplifier 60 is coupled to the base electrode of transistor 106 by a conductor 62. The level of the picture carrier at the base electrode of transistor 106 varies over a 20db range, from one volt rms at sync tip to 100 millivolts at white level.

The collector electrode of the mixer transistor 106 is coupled to the +B supply by a resistor 110 and a capacitor 114. The signals at the collector electrode of transistor 106 are also applied to the base of an emitter follower transistor 116. Transistor 116 has a collector electrode coupled to the +B supply and an emitter electrode coupled to ground by a resistor 118. The emitter electrode of transistor 116 is also coupled to the base of a transistor 126 by the serial connection of a resistor 122 and a resistor 124. A capacitor 130 is coupled from the base electrode of transistor 126 to the +B supply.

The collector electrode of transistor 126 is coupled to the +B supply, and its emitter electrode is coupled to ground by a resistor 128, and to the junction of the resistors 122 and 124 by a capacitor 132. The 4.5 MHz intercarrier sound signal developed at the emitter electrode of transistor 126 is coupled to an output terminal 140 by a resistor 142.

The sound and picture carrier signals which are coupled to the base electrode of transistor 104 are of sufficient amplitude to maintain transistor 104 in a linear operating condition. Transistor 104 thus acts as a current source for transistor 106 as it supplies the sound carrier to the emitter electrode of that transistor. In the absence of carrier signals, transistor 104 sets the quiescent operating point of transistor 106 at a low level in the forward biased region, as indicated by point "X" on the base-emitter transfer characteristic of transistor 106, shown in FIG. 2.

The curve 150 of FIG. 2 represents a typical base-emitter transfer characteristic for transistor 106. When the relatively high level picture carrier on conductor 62 is applied to the base electrode of transistor 106, the transistor operates nonlinearly as its base-to-emitter junction traverses the characteristic curve 150 from cutoff at point 154 to its forward biased region at point 156. This nonlinear operation of transistor 106 produces intermodulation of the sound and picture carriers across the base-to-emitter junction of the transistor, and a resultant 4.5 MHz intercarrier beat is developed in amplified form at its collector electrodes.

The sound and picture carriers also appear in amplified form at the collector electrode of transistor 106, and must be removed. These carrier frequencies are eliminated by the two lowpass filters which are coupled between the collector of transistor 106 and the output terminal 140. A first R-C lowpass filter 110 is comprised of a resistor 112 and a capacitor 114 coupled to the collector electrode of transistor 106. The R-C lowpass filter 110 exhibits a response with a gradual rolloff at higher frequencies which attenuates signals at the sound and picture carrier frequencies.

The signals passed by lowpass filter 110 are coupled to a second lowpass filter 120 by transistor 116. Lowpass filter 112 is an active filter comprised of circuit elements 122-132. The coupling of feedback capacitor 132 between the emitter of transistor 126 and the junction of resistors 122 and 124 provides the active filter 120 with a Chebychev response. This response is characterized by an essentially flat response from D.C. to a frequency just beyond that of the 4.5 MHz intercarrier sound signal, at which point the response exhibits a sharp rolloff. Lowpass filters 110 and 112 thus operate to severely attenuate signals at the sound and picture carrier frequencies.

The nonlinear operation of transistor 106, which mixes the sound and picture carriers, also results in the detection of low frequency video signal components of the picture carrier at the base-to-emitter junction of the transistor. These video signal components include both horizontal line rate (approximately 15,734 Hz) and vertical field rate (approximately 60 Hz) television sync signal components. While the horizontal line rate modulation is normally too high in frequency to present problems in the sound system, the vertical rate modulation can produce an audible buzz in the sound system if allowed to overload transistor 106. However, the low frequency video signal components at the base-to-emitter junction of transistor 106 do not appear in amplified form at the collector of transistor 106 due to the emitter degeneration of the transistor 106. The emitter degeneration results in attenuation, or only insignificant amplification, of the low frequency components of the video signal by transistor 106, but permits substantial amplification of the relatively high frequency 4.5 MHz intercarrier sound signal and the picture sound carriers.

The attenuation of low frequency signals may be explained by examining the amplification properties of the mixer transistor 106. The gain of transistor 106 is calculated by dividing the load impedance at its collector electrode by the source impedance at its emitter electrode. At low frequencies, transistor 106 has a relatively small load (collector) impedance and a relatively high source (emitter) impedance, resulting in low gain for low frequency signals. For example, for a D.C. signal, the load impedance is equal to the value of resistor 112 (in the example shown in FIG. 1, 10 kilohms), and the source impedance is equal to the collector output impedance of the transistor 104 (100 kilohms), which operates as a high impedance, constant current source at low frequencies. Transistor 106 thus has a gain of 0.1 for a D.C. signal. For higher frequency signals, transistor 104 no longer approximates a constant current source, and its impedance decreases. In addition, the reactance of capacitor 108 decreases at higher frequencies, and the net effect of transistor 104 and capacitor 108 is a reduction in the emitter (source) impedance of transistor 106 at higher frequencies. The load impedance of transistor 106 will also decline at higher frequencies due to the effect of capacitor 114, but this rate of decline is substantially less than the rate of decline of the source impedance. Thus, transistor 106 will exhibit emitter degeneration, whereby the transistor will amplify higher frequency signals to a greater degree than lower frequency signals. The signals at the collector electrode of transistor 106 will therefore be substantially free of audible, low frequency, amplitude modulated signal components. Amplification of the intercarrier sound signal prior to filtering by the 4.5 MHz bandpass filter is thus provided by the mixer transistor 106 without attendant overload or signal distortion.

The sound converter 100 of the present invention benefits from the use of the high level picture carrier signal provided by the final I.F. amplifier 60 as a mixing signal. This high level signal is of sufficient amplitude to ensure the nonlinear operation required for mixing action in transistor 106. Moreover, even at its minimum amplitude (100 millivolts), the picture carrier on conductor 62 is of sufficient amplitude relative to the sound carrier on conductor 42 (6 millivolts) to minimize undesirable amplitude modulation of the intermodulated intercarrier sound signal.

The sound converter 100 of the present invention can alternatively be constructed as illustrated in FIG. 3, with both the sound and picture carriers applied to the base electrode of transistor 106. In this configuration, the collector of transistor 104 is coupled to the base electrode of transistor 106 instead of the emitter electrode. Transistor 104 is replaced as the source impedance at the emitter of transistor 106 by a 100 kilohm resistor 160 from the emitter electrode to ground, thereby retaining a 100 K source impedance at D.C. at the emitter electrode. The picture carrier is applied to the base electrode of transistor 106 from conductor 62 by a series decoupling resistor 162. The decoupling resistor 162 reduces the coupling of the sound carrier from the collector of transistor 104 back into the final I.F. amplifier 60, which would tend to develop the visible 920 KHz beat between the sound carrier and the color subcarrier in the video channel. This coupling of the sound carrier back into the final I.F. amplifier can be further reduced by driving conductor 62 by a buffer stage from the final I.F. amplifier 60.

The sound converter 200 illustrated in FIG. 3 will reduce the effect of low frequency, amplitude modulated video signal components at the collector of transistor 106 by virtue of the degenerative circuit arrangement at the emitter of transistor 106. The sound converter 200 operates in substantially the same manner as the sound converter 100 described above, as the reactance of capacitor 108 increases the source (emitter) impedance of transistor 106 for low frequency signals. Thus, the 4.5 MHz intercarrier sound signal will be amplified to a greater extent than the low frequency video signal components which are detected at the base-to-emitter junction of transistor 106.

In the circuits described in FIGS. 1 and 3, it is possible for ineffectual trapping of the sound carrier by the 41.25 MHz trap 50 to result in the application of some remaining portion of the sound carrier to the base of transistor 106 from the final I.F. amplifier 60. It is possible for this residual sound carrier to be in a phase relationship to the sound carrier provided by transistor 104 such that the sound carrier will be attenuated or even eliminated at transistor 106. This undesirable effect can be prevented by maintaining a sufficiently high level (e.g., 5–6 millivolt) sound carrier signal at the bases of transistors 102 and 104. The high level sound carrier provided by transistor 104 will ensure that any residual sound carrier supplied by final I.F. amplifier 60 will cause the intermodulating sound carrier at transistor 106 to be only slightly attenuated. If the 41.25 MHz trap 50 is broadly tuned to remove the sound carrier and its sidebands out to ±50 KHz from the carrier, this slight attenuation of the sound carrier should not occur.

What is claimed is:

1. In a television receiver, a circuit for combining a sound carrier signal, which is frequency modulated with sound information, with a picture carrier signal, which is amplitude modulated by a video signal to develop an intercarrier sound signal comprising:
   an amplifying device having a base electrode, an emitter electrode, and a collector electrode, and a rectifying junction intermediate said base and emitter electrodes;
   an input signal path, including said base and emitter electrodes, for applying said modulated sound and picture carrier signals to said rectifying junction;
   an output signal path, including said collector electrode and one of said base and emitter electrodes, for developing amplified signals including an intercarrier sound signal; and
   means, common to said input and output signal paths, and including an impedance which varies inversely with frequency for causing the amplification provided by said amplifying device to vary directly with frequency over a band of frequencies inclusive of said video signal and said intercarrier sound signal.

2. The apparatus of claim 1, wherein said amplification varying means comprises a capacitor.

3. The apparatus of claim 2, wherein said amplification varying means further comprises a current source transistor having a collector-to-emitter path coupled in parallel with said capacitor.

4. The apparatus of claim 1 or 3, further comprising first and second intermediate frequency amplifiers, and means for coupling the output of said first intermediate frequency amplifier to the input of said second intermediate frequency amplifier;

wherein said coupling means includes a sound carrier trap whereby said modulated sound carrier is removed from the signals applied to said second intermediate frequency amplifier;

and wherein said input signal path is rendered responsive to modulated sound carrier signals derived from the output of said first intermediate frequency amplifier, and to modulated picture carrier signals derived from the output of said second intermediate frequency amplifier.

5. The apparatus of claim 1, further comprising a lowpass filter coupled to the collector electrode of said amplifying device for attenuating those of said amplified signals having frequencies in the range of said sound and picture carriers.

6. The apparatus of claim 1, further comprising a lowpass filter coupled to the collector electrode of said amplifying device for attenuating those of said amplified signals having frequencies which are greater than the frequency of said intercarrier sound signal.

7. In a television receiver, a circuit for combining a sound carrier signal, which is frequency modulated with sound information, with a picture carrier signal, which is amplitude modulated with video information, to develop an intercarrier sound signal comprising:

a source of sound and picture carrier signals;

a first amplifier coupled to said signal source and having an output for generating relatively low level sound and picture carrier signals;

means, coupled to the output of said first amplifier, for attenuating said sound carrier signal relative to said picture carrier signal;

a second amplifier coupled to said sound carrier attenuating means and having an output for generating a relatively high level picture carrier signal;

a first transistor having a base coupled to the output of said first amplifier, an emitter coupled to a source of reference potential, and a collector;

a second transistor having a base coupled to the output of said second amplifier, an emitter coupled to the collector of said first transistor, and a collector for generating amplified signals including an intercarrier sound signal; and a capacitive element coupled between the emitter of said second transistor and said source of reference potential.

8. The apparatus of claim 7, further comprising a lowpass filter coupled to the collector of said second transistor for attenuating those of said amplified signals having frequencies in the range of said sound and picture carriers.

9. The apparatus of claim 7, further comprising an active filter coupled to the collector of said second transistor for attenuating those of said amplified signals having frequencies which are greater than the frequency of said intercarrier sound signal.

10. Apparatus in accordance with claim 9 wherein said transistors, said capacitance, and said active filter are realized in integrated circuit form on a common monolithic integrated circuit chip.

* * * * *